April 21, 1931.  F. C. McMANUS  1,801,283
STEERING WHEEL RIM
Filed Nov. 14, 1929  2 Sheets-Sheet 2
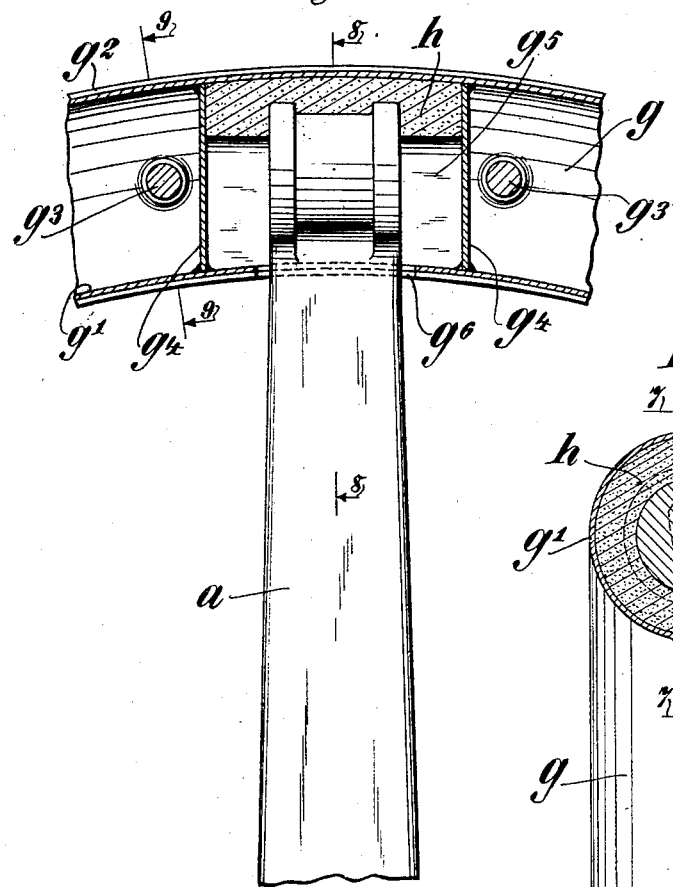
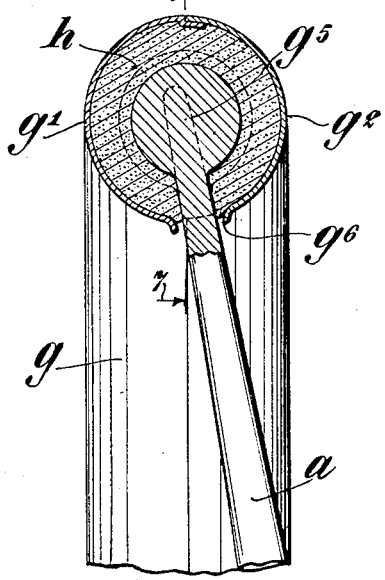
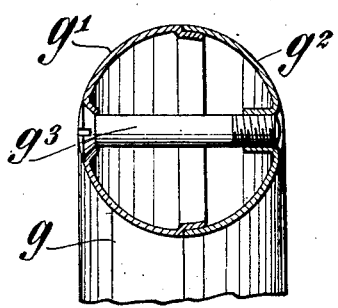
INVENTOR
Frank C. McManus,
BY Redding, Greeley, O'Shea + Campbell
his ATTORNEYS Patented Apr. 21, 1931

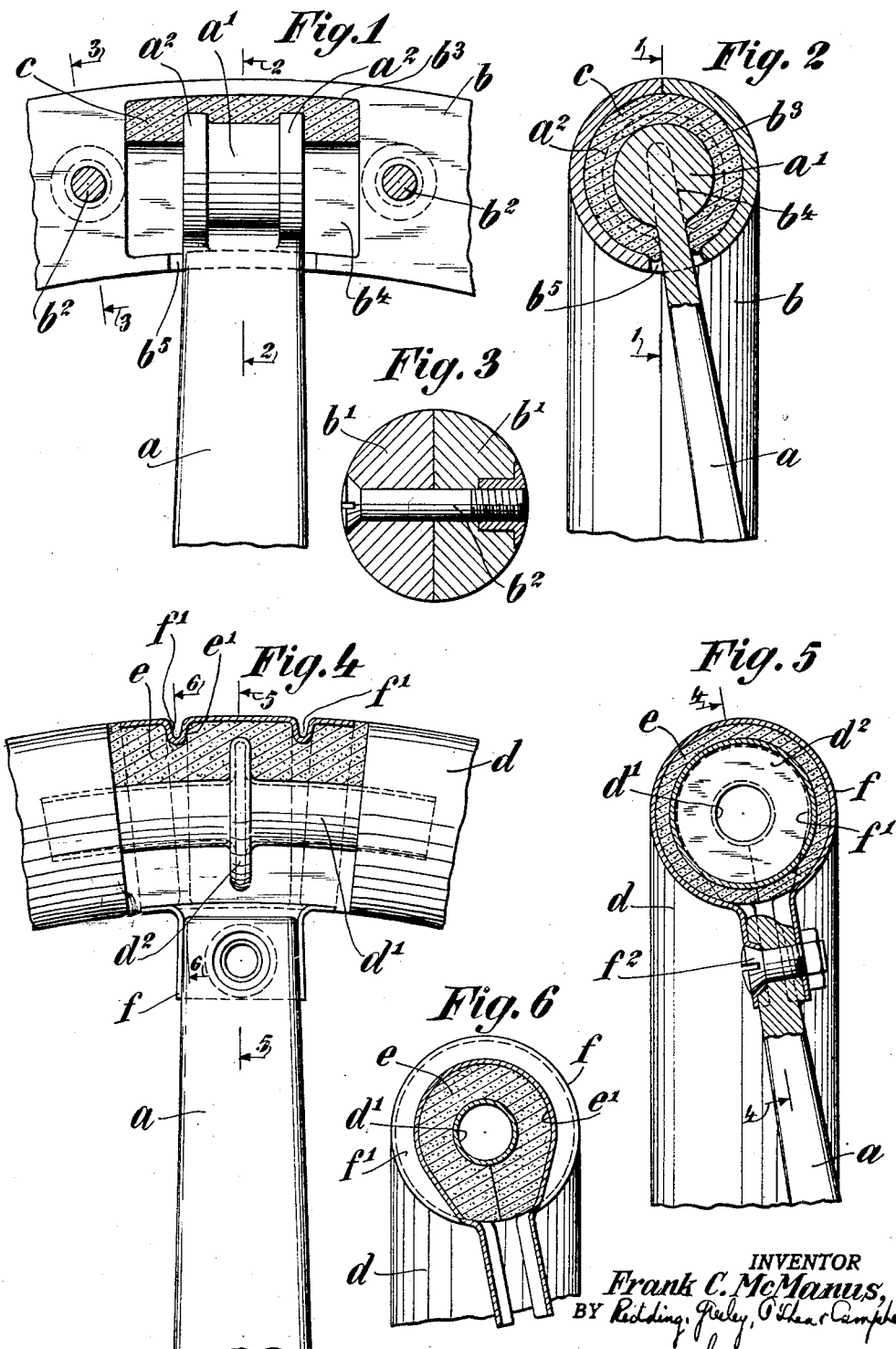

1,801,283

UNITED STATES PATENT OFFICE

FRANK C. McMANUS, OF BROOKLYN, NEW YORK, ASSIGNOR TO INTERNATIONAL MOTOR COMPANY, OF NEW YORK, N. Y., A CORPORATION OF DELAWARE

STEERING-WHEEL RIM

Application filed November 14, 1929. Serial No. 407,058.

The present invention relates to steering mechanisms and embodies, more specifically, an improved steering wheel rim mounted upon a spider, or supporting member, in such manner that shocks and vibrations from the steering column, incident to movement of the vehicle over irregularities in road surface, will not be transmitted to the steering wheel rim and the hands of the driver of the vehicle.

With a view to eliminating, or reducing to a minimum, the vibrations transmitted to the steering wheel rim, various cushioning devices have been devised, certain forms thereof embodying cushioning elements in the connections between the drag link, tie rod, and steering arm of the steering mechanism. Since the movement of the steering column is considerably amplified in the steering wheel rim, very slight vibrations thereof will be quite noticeable and objectionable in the rim regardless of the precaution taken in the steering mechanism to eliminate such vibrations, and the present invention seeks to cushion, materially, such movement before it is transmitted to the hands of the operator.

An object of the invention, accordingly, is to provide a cushioning mechanism for the steering rim of a vehicle.

A further object of the invention is to provide a cushioning mechanism mounted between the supporting spider carried by the steering column and the steering wheel rim mounted thereon.

A further object of the invention is to provide a cushioning mechanism of the above character in which the parts thereof are simple in construction and easily manufactured and assembled.

Further objects, not specifically enumerated above, will be apparent when the invention is described in greater detail in connection with the accompanying drawings, wherein:

Figure 1 is a segmental plan view in section, taken on line 1—1 of Figure 2, and looking in the direction of the arrows.

Figure 2 is a view in section, taken on line 2—2 of Figure 1, and looking in the direction of the arrows.

Figure 3 is a view in section, taken on line 3—3 of Figure 1, and looking in the direction of the arrows.

Figure 4 is a view in section, similar to Figure 1, and taken on line 4—4 of Figure 5, this view illustrating a modified form of connection.

Figure 5 is a view in section, taken on line 5—5 of Figure 4, and looking in the direction of the arrows.

Figure 6 is a view in section, taken on line 6—6 of Figure 4, and looking in the direction of the arrows.

Figure 7 shows a further modification of the invention and is a view similar to Figure 1, taken on line 7—7 of Figure 8, and looking in the direction of the arrows.

Figure 8 is a view in section, taken on line 8—8 of Figure 7, and looking in the direction of the arrows.

Figure 9 is a view in section, taken on line 9—9 of Figure 7, and looking in the direction of the arrows.

Referring to the above drawings, particularly Figures 1, 2, and 3, $a$ indicates one of the diverging arms of a steering wheel spider. This arm is formed with an enlarged portion $a'$ having parallel flanges $a^2$.

The steering wheel rim is indicated at $b$ and is formed of two sections $b'$. These sections are secured together by means of bolts $b^2$ and opposed concavities $b^3$ are formed in the respective sections $b'$ to provide a recess $b^4$. The rim is formed with an opening $b^5$ within which the end of the arm $a$ extends, and a block of yielding non-metallic material $c$ is carried within the recess $b^4$ and surrounds the enlarged portion $a'$ and flanges $a^2$ of the arm $a$.

From the above, it will be seen that relative movement between the arm $a$ and rim $b$ is cushioned by means of the block of yielding non-metallic material $c$, thereby effectively cushioning the vibrations transmitted to the driver's hands.

In the construction shown in Figures 4, 5, and 6, the steering wheel rim is formed of a plurality of arcuate sections $d$ assembled upon shafts $d'$ which are concentric with the arcuate rim sections $d$. A flange $d^2$ is formed upon each shaft section $d$, and a block of yielding non-metallic material $e$ is spaced between the arcuate sections $d$ and about the appropriate shaft $d'$ and flange $d^2$.

The blocks of yielding non-metallic material are formed with peripheral grooves $e'$ and the arm $a$ has secured to the extremity thereof, a housing $f$. This housing is formed with inwardly extending ribs $f'$ to engage the peripheral grooves $e'$ and is secured to the arm $a$ by means of a suitable bolt $f^2$. It will be seen from an inspection of Figure 4 that the housing does not extend completely between adjacent arcuate sections $d$. In this manner, relative movement between the housing and arcuate sections is accommodated, such movement being yieldingly opposed by the block of yielding non-metallic material $e$.

In the construction shown in Figures 7, 8, and 9, the arm $a$ of the steering wheel spider is formed in a manner similar to that shown in the construction of Figures 1, 2, and 3. The steering wheel rim $g$ is formed of metal sections $g'$ and $g^2$, these sections being secured together by means of bolts $g^3$. Spaced transverse partitions $g^4$ are formed in the sections to provide a recess $g^5$ within which a block of yielding non-metallic material $h$ is received. An opening $g^6$ accommodates the end of the arm $a$ and permits the enlarged portion thereof to be secured within the block of yielding non-metallic material $h$. The construction shown in these figures, therefore, affords the yielding connection described in the construction shown in Figures 1, 2, and 3, the character of the rim being modified from the construction of such figures.

While the invention has been described with specific reference to the accompanying drawings, it is not to be limited, save as defined in the appended claims.

I claim as my invention:

1. A steering wheel comprising a spider having diverging arms, a plurality of rim segments, connecting shafts between the segments, flanges on the shafts, cushioning means mounted between the segments and engaging the flanges, sleeves carried by the arms, circumferential grooves in the cushioning means, and ribs in the sleeves engaging the grooves.

2. A steering wheel comprising a spider having diverging arms, a plurality of rim segments, connecting shafts between the segments, flanges on the shafts, cushioning means mounted between the segments and engaging the flanges, sleeves carried by the arms, and means to secure the sleeves to the cushioning means.

3. A steering wheel comprising a spider having diverging arms, a plurality of rim segments, connecting shafts between the segments, flanges on the shafts, cushioning means mounted between the segments and engaging the flanges, and means to mount the arms on the cushioning means.

This specification signed this 7th day of November, A. D. 1929.

FRANK C. McMANUS.